United States Patent [19]

Sifri

[11] Patent Number: 4,487,218
[45] Date of Patent: Dec. 11, 1984

[54] LINE TAKE-UP ASSEMBLY FOR A LIFT TRUCK

[75] Inventor: Elie C. Sifri, Gresham, Oreg.

[73] Assignee: Cascade Corporation, Portland, Oreg.

[21] Appl. No.: 392,362

[22] Filed: Jun. 25, 1982

[51] Int. Cl.³ .......................................... B65H 75/34
[52] U.S. Cl. ......................... 137/355.26; 137/355.23; 137/355.12; 242/86.2; 138/110; 138/120
[58] Field of Search ............... 137/355.17, 355.23, 137/355.26, 343, 615, 355.12; 91/437; 60/468, 494; 242/86, 86.2; 138/110, 120

[56] References Cited

U.S. PATENT DOCUMENTS

| 2,629,630 | 2/1953 | Roark | 137/355.23 |
|---|---|---|---|
| 3,060,972 | 10/1962 | Sheldon | 138/120 |
| 3,330,105 | 7/1967 | Weber | 138/120 |
| 3,467,134 | 9/1969 | Becker et al. | 137/355.17 |
| 3,552,425 | 1/1971 | Olson | 137/355.17 |
| 3,709,252 | 1/1973 | Bishop | 137/355.17 |
| 3,782,409 | 1/1974 | House et al. | 137/355.17 |
| 3,979,998 | 9/1976 | Woda | 91/437 |
| 4,008,791 | 2/1977 | Shafii-Kahany et al. | 137/355.12 |
| 4,224,960 | 9/1980 | Nederman | 137/355.23 |

FOREIGN PATENT DOCUMENTS

1131480 12/1962 Fed. Rep. of Germany.

Primary Examiner—A. Michael Chambers
Attorney, Agent, or Firm—Chernoff, Vilhauer, McClung, Birdwell & Stenzel

[57] ABSTRACT

A take-up assembly for storing and selectively feeding and taking up flexible line, usually hydraulic hoses, extending between the body or mast of a lift truck and the vertically-reciprocating load carriage of the truck. The take-up assembly includes disassembly features for facilitating servicing of the take-up assembly and flexible lines while mounted on the truck and further includes external seal features for protecting its internal fluid seal structure from contamination and thereby improving its durability without permitting such external seals to add substantial rotational drag to the take-up assembly. Also provided are several features for facilitating the compatible mountability of the take-up assembly with respect to the lift truck, including a built-in pressure-relief system for protecting the fluid lines and load-handling attachment served by the fluid lines from any excessive pressures which might otherwise result from the design or operation of the lift truck's hydraulic system, an improved line-coupling device for attaching the forward ends of the fluid lines to the lift truck carriage with less likelihood of leakage or interference with mast structure, and a reversible retracting spring.

15 Claims, 13 Drawing Figures

LINE TAKE-UP ASSEMBLY FOR A LIFT TRUCK

BACKGROUND OF THE INVENTION

This invention relates to improvements in an assembly for taking up and paying out flexible line, such as flexible hydraulic line. More particularly, the take-up assembly is specially designed for mounting on the mast of a lift truck such that the flexible line extends between the mast and the vertically reciprocating load carriage of the lift truck, upon which is mounted a powered load-handling attachment such as a clamp or side shifter.

Usually the moving parts of a lift truck load-handling attachment are powered by double-acting hydraulic cylinders, with respect to which hydraulic fluid must be simultaneously supplied and exhausted during operation. Such supply and exhaust of fluid is provided through a pair of flexible hydraulic lines extending to the lift truck carriage from a rotary reel of the take-up assembly, such reel in turn being connected through a rotary fluid coupling and through a further pair of hydraulic lines to the control valves of the hydraulic system of the lift truck. In order to accommodate the substantial vertical range of motion of the lift truck carriage and its associated load-handling attachment, the reel of the take-up assembly normally has sufficient storage capacity to permit paying out of the line to the limits of vertical travel of the load carriage, and is spring-loaded so as to impose a tension on the line to prevent slack and provide torque for rewinding of the line as the carriage moves closer to the take-up assembly.

The primary design objectives of lift-truck take-up assemblies have included serviceability, durability and compatibility with respect to the lift truck. With respect to serviceability, substantial design effort has been expended in the past to faciliate servicing and repair of take-up assemblies and their related flexible lines while mounted on the lift truck without requiring excessive disassembly. In this regard, reference is made particularly to U.S. Pat. Nos. 3,552,425 and 3,782,409, both of which are directed to the solution of certain problems relating to serviceability. A drawback of these designs however is that removal of the outer flange of the reel, which is particularly susceptible to damage and the need for replacement because of its exposed location, necessarily also results in removal of a substantial portion of the line-supporting hub of the reel, such that removal of the outer flange leaves a major portion of the wound line unsupported. This makes it difficult to retain the wound line in place when replacing the outer flange and, unless the line is removed from the reel, the unsupported coils can become a hindrance during servicing and reassembly.

A number of other take-up assemblies have been marketed which permit removal of the outer flange while retaining the entire line-supporting hub in place in its entirety. Although these assemblies, specifically those manufactured by Kaup and Tecalemit, retain the entirety of the hub in its line-supporting relation to the wound line despite removal of the outer flange, the retention of the hub in its entirety hinders the serviceability of other parts of the reel, particularly the line connectors located within the hub.

Previous take-up assemblies have different sets of connectors detachably connecting the flanges to the hub, and the retracting spring assembly to the hub, respectively. This is partially advantageous because it permits the removal of the outer flange of the reel without disrupting the highly-wound spring assembly. On the other hand, servicing of the spring assembly is rendered more difficult by the need for access to and manipulation of two separate sets of connectors for servicing the spring assembly.

A major problem with respect to the durability of hydraulic hose take-up devices is the durability of their seal structure for preventing leakage of the highly-pressurized hydraulic fluid which must be conducted through a rotary fluid coupling in the take-up assembly. Since lift trucks often operate in wet or dusty environments, contaminants in the form of water and dust can ultimately invade the close-tolerance seal structure of the rotary coupling and, by corrosion and wear, cause the onset of leakage. Attempts to use compression-type external seals to block such contamination result in excessive frictional resistance to rotation of the reel. Conversely, non-compression-type felt seals are unable to prevent moisture contamination of the internal hydraulic seal structure.

Compatibility of take-up assemblies with respect to lift trucks has become an increasing problem as lift truck designs have changed. For example the hydraulic systems of different lift trucks are capable of imposing different hydraulic pressures on the take-up assembly, fluid lines and load-handling attachment. If the pressure is excessive it can cause leakage in the load-handling attachment or damage to the fluid lines.

Another problem involving both durability and compatibility has developed with respect to the fluid coupling by which the forward ends of the fluid lines extending from the take-up assembly are connected to the lift truck load carriage. Conventionally such fluid coupling has employed a swivel structure as shown in U.S. Pat. No. 3,552,425 for permitting the fluid lines to assume either an upwardly-pivoted attitude when the carriage is lowered or a downwardly-pivoted attitude when the carriage is raised above the elevation of the take-up assembly. Such swivel fluid couplings are susceptible to leakage for the same reasons discussed previously with respect to the rotary fluid coupling of the take-up assembly. Moreover such swivel couplings sometimes protrude rearwardly from the load carriage a sufficient distance to interfere with other portions of the lift truck when the load carriage reciprocates vertically. Such interference principally occurs with respect to those lift trucks where the pistons of the mast's hydraulic tilt cylinders are attached to the sides of the mast at a relatively forward location. U.S. Pat. No. 2,975,807 shows a type of fluid line coupling between relatively movable parts which dispenses with the need for a swivel coupling. However, such coupling lacks the serviceability required for lift truck applications where fluid lines are highly suseptible to wear and other damage and require relatively frequent replacement without the expenditure of substantial time and effort.

A further problem involving compatibility of take-up assemblies with respect to lift trucks has been the requirement that some take-up assemblies, because of space constraints on the truck, must be mounted on the left side of the mast while others must be mounted on the right side. Unfortunately right side and left side take-up assemblies are not easily interchangeable, primarily because the helical retracting spring assemblies of the great majority of line take-up assemblies do not have reversible springs for permitting the take-up assembly to be mounted on either side of the mast. However the aforementioned Tecalemit take-up assembly is equipped with a reversible spring which is removably mounted within the spring housing such that, if the spring housing is detached from the remainder of the take-up assembly, the spring may be removed therefrom, inverted and replaced in a reverse configuration. In order to render the heavy, wound helical spring removable from its spring housing without permitting it to become dislodged from its helical configuration thereby endangering those around it, it must be restrained in some manner during the removal and replacement procedure. In the aforementioned Tecalemit take-up assembly such restraint is provided by a band surrounding the perimeter of the spring, such band having a pair of generally square, spring-enclosing shrouds spot-welded at their corners to each side of the band. The outer end of the Tecalemit spring is removably connected to the spring housing by means of a loop positioned interior of the restraining band which slidably engages an anchoring post protruding from the interior of the spring housing adjacent its perimeter, such loop being selectively slidable onto and off of the anchoring post in either of the spring's two reversed positions. The primary problem with this arrangement is that the spring restraint structure and spring anchoring post require a substantial annular, peripheral clearance between the exterior of the spring and the interior of the spring housing, thereby increasing the diameter of the spring housing substantially. Most line take-up assemblies are mounted on the mast with the outside of the spring housing located directly behind an outwardly-protruding flange of the mast as close thereto as possible, so as to minimize both the transverse protrusion and the rearward protrusion of the line take-up assembly. Minimizing transverse protrusion is necessary to prevent damage to the take-up assembly when the truck operates in close quarters, while minimizing rearward protrusion is necessary to prevent the take-up assembly from striking the truck's overhead guard upon rearward tilt of the mast. Any substantial increase in the diameter of the spring housing therefore can create a disadvantage in compatibly mounting the take-up assembly on the mast, depending on the design of the lift truck.

SUMMARY OF THE PRESENT INVENTION

The present invention provides a line take-up assembly for a lift truck offering improved serviceability, durability and compatibility with respect to the points discussed above.

Improved serviceability of the take-up assembly of the present invention is provided in part by a reel structure wherein the line-storing hub comprises two separable line-supporting surface portions, each having axially-extending widths traversing substantially the entire distance between the flanges of the reel. The outer flange of the reel is detachably connected to the hub for permitting removal of the flange together with one of such line-supporting hub portions, while retaining in place substantially the entire width of the outer line-supporting portion of the hub. The removable line-supporting portion of the hub is preferably located adjacent the line attachment fittings within the hub so as to facilitate access thereto, and preferably comprises only a minor portion of the line-supporting surface area of the hub so that the wound coils of the line remain supported despite such removal.

As a further improvement to serviceability, the take-up assembly of the present invention provides a single set of connectors each detachably connecting both the flanges and the retracting spring assembly to the hub, thereby simplifying servicing of the spring assembly. Despite the fact that the single set of connectors connects the spring assembly to the hub, however, an interlocking structure between the hub and the spring assembly is provided which retains the spring assembly in operative relationship with the hub despite the removal of the aforeaforementioned set of connectors if it is desired to service only the outer flange or fluid lines rather than the hub or spring assembly.

Improved durability of the hydraulic seal structure of the take-up assembly of the present invention is provided by the provision of a unique external seal structure which prevents contamination of the hydraulic seals by water and dust. Resilient, water-resistant, elastomer external seals are stretched in tension about respective annular tapered seal-supporting surfaces which, due to the tension of the resilient seals, urge the seals axially against seal-engaging surfaces. The use of a tension rather than compression principle to provide the external sealing eliminates a problem encountered with previous compression-type water resistant seals by reducing substantially the frictional resistance of such seals to rotation of the reel. This is particularly important with respect to the ability of the reel to retract hydraulic lines under the force of the retracting spring and to maintain the lines taut at all times.

Compatibility of the take-up assembly of the present invention with respect to the lift truck is improved in several respects. The problem of harmful different maximum fluid pressures imposed upon the take-up assembly, fluid lines and load-handling attachment by the hydraulic systems of different lift trucks is solved by the provision of integral pressure-relief valves mounted on the rotary fluid coupling of the take-up assembly. These pressure-relief valves interconnect the two major fluid passageways of the take-up assembly and are preferably mounted in the journal member of the fluid coupling to protect the take-up assembly's hydraulic seals as well. Any excessive pressure imposed by the hydraulic system of the lift truck is counteracted by these integral pressure-relief valves, regardless of which of the two fluid passageways is being supplied with pressurized fluid at the time, by exhausting a portion of the overpressure fluid into the opposite fluid passageway.

Furthermore the fluid coupling, by which the forward ends of the fluid lines extending from the take-up assembly are connected to the lift truck load carriage, has been improved both with respect to its durability and compatibility relative to the lift truck. The swivel coupling employed by the prior art is replaced by an elongate flexible restraint, protruding rearwardly from the load carriage to a lesser degree than the swivel coupling and enclosing a predetermined minor portion of the length of the flexible fluid line adjacent to the carriage, for limiting the curvature of such portion of the fluid line to a minimum radius of curvature despite the tension imposed upon the line by the spring assembly. Such flexible restraint has an interior elongate enclosure for enclosing the fluid lines and an outer side which, although retaining the fluid lines in the enclosure, has an elongate opening therein for permitting the fluid lines to be passed transversely into or out of the enclosure respectively to facilitate replacement of the fluid lines.

Reversibility of the retracting spring of the line take-up assembly, without requiring any substantial increase in the diameter of the spring housing, is provided by an arrangement wherein the helical spring is partially enclosed by a rigid, dish-shaped, generally cylindrical enclosure removably mountable within the spring housing in a position which is nonconcentric with respect to the spring housing. The outer end of the spring, rather than being removably connected to the spring housing, is instead permanently affixed to the inside of the dish-shaped enclosure, the exterior of the dish-shaped enclosure including a key member which slidably interlocks with a mating keyway formed on the interior perimeter of the spring housing. The fact that the spring enclosure mounts nonconcentrically within the spring housing, and is of a rigid, dish-shaped construction so as to resist any deformation which might otherwise be caused by the forces of the spring within it, requires much less peripheral clearance between the spring and the spring housing than has been necessary in the past for the same size spring, thereby making it possible for the spring housing to be of substantially reduced diameter even though its enclosed spring is capable of being reversed within the housing. Moreover, the arrangement whereby the outer end of the spring is connected permanently to the removable spring enclosure, the spring enclosure in turn being removably connected to the spring housing, is a more compact detachable spring-anchoring structure than has been employed in the past, contributing to further minimizing of the spring housing diameter and also providing a continuing fixed attachment between the spring and removable spring enclosure during the spring reversing process so as to retain the spring within the enclosure without the need for shrouds on both sides of the spring.

Accordingly, it is a principal objective of the present invention to improve the serviceability of a line take-up assembly for a lift truck by improving the hub structure of the take-up assembly in relation to the removability of the outer flange thereof, and by consolidating the detachable connectors which connect the flanges and spring assembly respectively to the hub.

It is a further principal objective of the present invention to improve the durability of such line take-up assembly by protecting its fluid seals from external contamination without thereby hindering the rotatability of the take-up assembly, and by improving the leak-resistant quality of the coupling by which the fluid lines are connected to the lift truck carriage.

It is a further principal objective of the present invention to improve the compatibility of the take-up assembly with respect to the lift truck by providing integral pressure-relief means in the take-up assembly for protecting the load-handling attachment, fluid lines and take-up assembly from excessive hydraulic pressures, by providing a more compact line coupling to the lift truck carriage, and by providing a reversible retracting spring without thereby substantially increasing the diameter of the spring housing.

The foregoing and other objectives, features, and advantages of the present invention will be more readily understood upon consideration of the following detailed description of the invention, taken in conjunction with the accompanying drawings.

DETAILED DESCRIPTION OF THE INVENTION

Figures 1, 2:
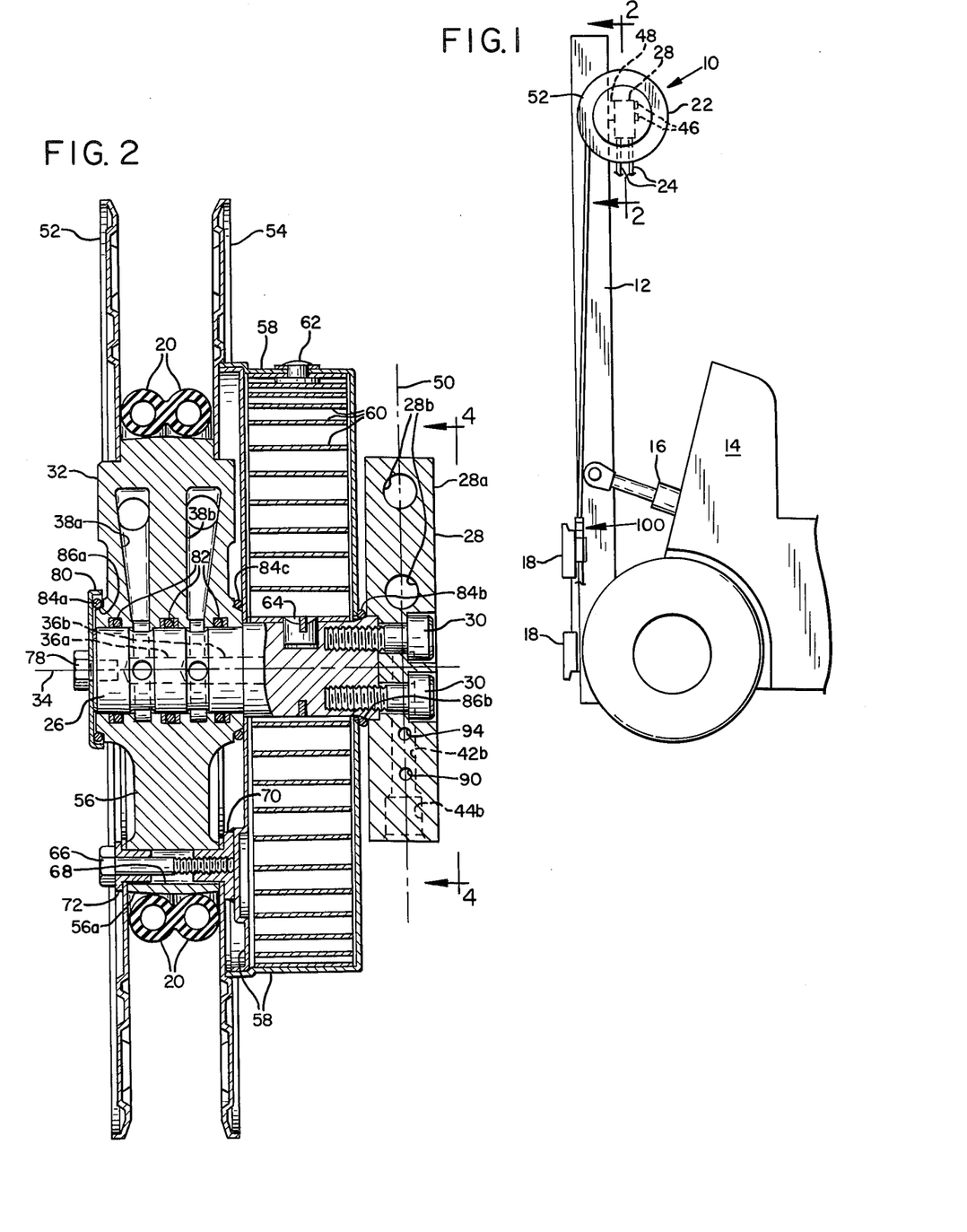
FIG. 1 is a partial elevation view of a lift truck having an embodiment of the line take-up assembly of the present invention mounted on the mast thereof, such embodiment having a non-reversible retracting spring.
FIG. 2 is an enlarged transverse cross-sectional view of the line take-up assembly, taken along line 2—2 of FIG. 1.

The line take-up assembly, indicated generally as 10 in FIG. 1, is normally mounted on the outer section 12 of a mast of a lift truck 14. The mast is tiltable forwardly and rearwardly with respect to the lift truck 14 by a pair of selectively extensible and retractable hydraulic tilt cylinders 16, only one of which is shown, and the mast has a load carriage 18 mounted for vertical reciprocation thereon. Normally the mast has one or more extensible inner sections which permit the load carriage 18 to move vertically on the mast from its lowered position as shown in FIG. 1 to an elevated position substantially higher than the top of the outer mast section 12.

Load carriages may have various types of powered load-handling equipment mounted thereon, such as clamps or side shifters (not shown). Usually the moving parts of such load-handling attachments are powered by double-acting hydraulic cylinders with respect to which hydraulic fluid must be simultaneously supplied and exhausted during operation. Such supply and exhaust of fluid is provided through a pair of flexible hydraulic lines 20 extending to the lift truck carriage 18 from a rotary reel 22 of the take-up assembly 10, such reel in turn being connected through a rotary fluid coupling and a further pair of hydraulic lines 24 to an operator-controlled valve (not shown) in the hydraulic system of the lift truck 14.

Figure 3:
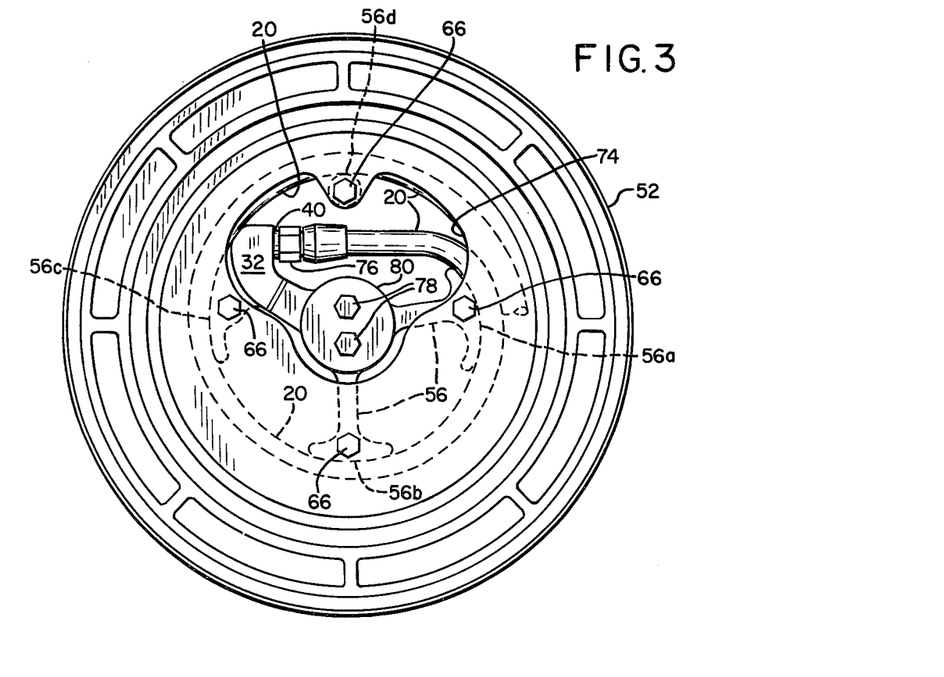
FIG. 3 is an outer side view of the line take-up assembly.
Figure 4:
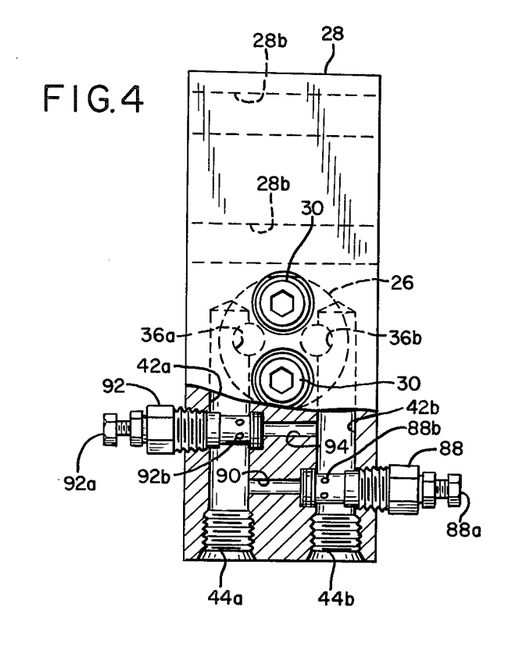
FIG. 4 is an inner side view of the mounting structure of the line take-up assembly taken along line 4—4 of FIG. 2.

With reference to FIGS. 2-4, the take-up assembly 10 comprises a journal member composed of a journal shaft 26 and take-up assembly mounting block 28 detachably connected together in a manifolded fashion by a pair of threaded bolts 30. A fluid line connector 32 is rotatably mounted upon the shaft 26 for rotation about an axis of rotation 34, the shaft 26 having a pair of fluid passageways ways 36a and 36b extending therethrough in communication with fluid passageways 38a and 38b, respectively, of the line connector so that the line connector 32 and the journal member together form a rotary fluid coupling having dual fluid passages through which fluid may be simultaneously supplied to and exhausted from the line connector 32. Line connector 32 has a pair of line attachment fittings 40 in side-by-side relationship (only one of which is shown in FIG. 3), each of the line attachment fittings 40 being in communication with a respective one of the fluid passageways 38a and 38b and thus detachably connecting a respective one of the flexible hydraulic lines 20 to a respective one of the fluid passageways 38a and 38b.

The dual fluid passages which extend through the rotary fluid coupling communicate with hydraulic lines 24 through respective downwardly directed fluid passageways 42a and 42b having threaded sockets 44a and 44b respectively into which line attachment fittings (not shown) can be inserted. The downward direction of the line attachment passageways 42a and 42b make it particularly convenient to mount the take-up assembly on the rearwardly-facing surface of the outer mast section 12 so as to minimize lateral protrusion of the take-up assembly without interference of the lines 24 with other mast structure. This is particularly important if the mast is any of a number of modern high-visibility masts wherein the conventional centrally-located hoist cylinder (which can impede visibility) has been replaced with one or more off-center hoist cylinders located in the area immediately behind the outer mast section. Since the lines 24 need not extend axially from the inside surface 28a of the mounting block 28, the mounting block and lines 24 can have a very thin transverse configuration. This thin configuration is aided by the fact that the passageways 42a and 42b and the forwardly-extending mounting apertures 28b, through which the take-up assembly mounting bolts 46 (FIG. 1) extend into a threaded spacer block 48 welded to the rear surface of the outer mast section 12, all intersect a common plane 50 (FIG. 2) perpendicular to the axis of rotation 34 of the take-up assembly.

The reel of the take-up assembly 10 includes an outer line-enclosing flange 52 and an inner line-enclosing flange 54 disposed opposite to and axially-spaced from each other and a line-storing hub 56 extending axially between the flanges about which the fluid lines 20 are collected in windings, such hub 56 and flanges 52 and 54 being rotatable about the journal shaft 26 in unison with the line connector 32. In fact, in the preferred embodiment, the line connector 32 and line-supporting portions 56a, 56b and 56c (FIG. 3) of hub 56 are all parts of the same integral casting for simplicity of construction.

A non-reversible helical spring assembly, comprising a spring housing 58 connected to the line connector 32 and hub 56 and rotatable in unison therewith with respect to the journal shaft 26, has a helical spring 60 mounted therein generally concentric with the axis of rotation 34, the outer end of the spring 60 being connected to the spring housing 58 by a rivet 62 and the inner end being affixed to the journal shaft 26 by a catch assembly 64 of the type shown in detail in the aforementioned U.S. Pat. No. 3,782,409, the disclosure of which is incorporated herein by reference. The spring assembly urges rotation of the hub 56 relative to the shaft 26 in a direction so as to impose tension on the hydraulic lines 20 and retract the hydraulic lines onto the hub 56.

As best seen in FIG. 3, the hub 56 comprises a set of arcuate line-supporting surface portions 56a, 56b and 56c which, as shown in FIG. 2 with respect to portion 56a, have axially-extending widths traversing substantially the entire distance between the flanges 52 and 54. In addition, a second line-supporting portion 56d of the hub, as seen in FIG. 3, is provided which also extends axially substantially the entire distance between the flanges 52 and 54 but is not part of the integral casting which includes the portions 56a, 56b and 56c. Rather the line-supporting portion 56d comprises a separate cylindrical bushing held in place solely by one of the four elongate connectors 66 which attach the flanges and spring assembly respectively to the hub 56, and is thereby removable. As can be seen in FIG. 3, the line-supporting bushing portion 56d of the hub comprises only a minor portion of the total line-supporting surface area of the hub, the majority of such supporting surface area being provided by portions 56a, 56b and 56c. It will also be noted that the bushing 56d is the closest of all the line-supporting surface portions of the hub to the line attachment fittings 40 and occupies a portion of the space into which a tool must be inserted to disconnect one or both of the lines 20 from the line connector 32. The significance of these facts will now be explained with respect to disassembly and servicing of the line take-up assembly.

As illustrated in FIG. 2, each of the elongate connectors 66 comprises a bolt inserted through the outer flange 52, passing through a respective aperture 68 in the hub, through the inner flange 54 and threaded into a nut 70. The nut 70 is spot-welded to the inner surface of the spring housing 58 and is slidably inserted through the inner flange 54 into the respective aperture 68. A spacer bushing 72 is likewise inserted through the outer flange 52 into the respective aperture 68 so that the flanges 52 and 54 can be of identical interchangeable construction.

The flanges 52 and 54 contain axially-aligned openings 74 (FIG. 3) through which access is permitted to the couplings such as 76 by which the lines 20 are connected to the line attachment fittings 40. However to permit replacement of the lines 20 it is desirable to remove the outer flange 52 by removal of the four connectors 66. In such case, to maximize the facility with which the lines 20 can be replaced, it is desirable that the major line-supporting surfaces of the hub 56, i.e. the surfaces represented by hub portions 56a, 56b and 56c, be retained over substantially their entire width in line-supporting relation to the lines 20 so that the lines 20 remain supported in their coiled configuration without collapsing inwardly or otherwise moving out of position. However, also in order to maximize the replaceability of the lines 20, it is further desirable that a minor portion of the line-supporting surface of the hub, represented by portion 56d, be entirely removable together with the outer flange 52. Since the portion 56d represents only a minor portion of the line-supporting surface area of the hub, its removal does not permit collapse or movement of the line coils but, inasmuch as such portion 56d occupies a critical portion of the space immediately adjacent the line attachment fittings 40 by which access may be had to the line couplings 76, its removal facilitates the insertion of a tool to unfasten or fasten the line couplings 76.

It is significant that removal of the four connectors 66 not only allows removal of the outer flange 52, for replacement of the lines 20 or replacement of a damaged outer flange 52, but also unfastens the inner flange 54, spring housing 58 and hub 56 with respect to one another. Thus if the required service involves not merely replacement of the lines 20 or outer flange 52 but rather repair or replacement of the hub 56 or its fluid seals, the inner flange 54 or the spring assembly, mere removal of bolts 78 which fasten a hub retainer cap 80 to the journal shaft 26 permit the hub 56, inner flange 54 and spring assembly to be separated from the shaft 26 and from one another without, for example, requiring access to a further set of bolts interconnecting the spring housing 58 to the hub 56 or inner flange 54 as has been the prior practice. It is also significant that, even though the connectors 66 do serve to detachably interconnect the flanges, hub and spring assembly with respect to one another, their removal does not necessarily require the operative disconnection of all of these components with respect to one another. This is particularly important with respect to the interconnection between the spring housing 58 and the hub 56 because, if replacement only of a damaged outer flange 52 is required, there is no need to disturb the operative interconnection of the spring housing 58 with the hub 56. The provision of the nuts 70 on the spring housing 58, each slidably inserted into a respective hub aperture 68, provides an interlock between the spring housing 58 and hub 56 through which the spring assembly can continue to urge rotation of the hub despite the removal of all of the connectors 66 if only minor servicing of the take-up assembly is needed.

The rotary interface between the line connector 32 and journal shaft 26 requires a fluid seal structure to prevent external leakage from, and cross leakage between, the dual passageways of the rotary fluid coupling. Such fluid sealing is provided in a conventional manner by compressed resilient elastomer O-rings 82 (FIG. 2). Because the lift truck 14, and thus the line take-up assembly 10, are likely to be operated under dusty and/or wet conditions, the finely-machined rotary surfaces against which the O-rings 82 are compressed can eventually be invaded by dirt and moisture contaminants which cause wear, corrosion and ultimate leakage. To prevent against such contamination, external resilient O-ring seals 84a and 84b are interposed between the rotary line connector 32 (and those elements such as the hub 56 and spring housing 58 fixedly connected to the line connector) and the journal shaft 26 about which the line connector, hub and spring housing rotate in unison. In order that O-rings 84a and 84b may form an effective seal between the fixed surfaces connected to the shaft 26 and the rotary surfaces connected to the line connector 32, without imposing excessive frictional resistance to turning, the O-rings 84a and 84b rather than being placed in compression are each stretched in tension about a respective annular seal-supporting surface 86a and 86b respectively as shown in FIG. 2. Seal-supporting surface 86a is formed on the line connector and hub casting and is tapered axially so as to cause the tension in the O-ring 84a to urge the O-ring outwardly in an axial direction against the inner seal-engaging surface of the journal cap 80, thereby forming the desired external seal between a rotary element and a stationary element connected with the shaft 26. Conversely, seal-supporting surface 86b is formed on the shaft 26 itself and is tapered axially so as to cause the tension in the O-ring 84b to urge the O-ring in an axial direction against the inner seal-engaging surface of the spring housing 58. The tension in the two seals 84a and 84b, coupled with the axially-tapered seal-supporting surfaces upon which they are mounted, accomplish the desired sealing against dirt and moisture contamination with significantly less frictional resistance between the relative turning surfaces than if the two seals were in compression.

A further external O-ring seal 84c is also provided between the line connector-hub casting and the spring housing 58, but this seal does not interact between surfaces which rotate with respect to each other. Nonetheless a tapered seal-supporting surface corresponding to surface 86a is also provided for seal 84c since it is desirable that the line connector-hub casting be reversible with respect to the other elements of the line take-up assembly 10.

As described above, the rotary fluid coupling composed of mounting block 28, journal shaft 26 and line connector 32 has a pair of fluid passages extending therethrough through which fluid may be simultaneously supplied to and exhausted from the line connector 32 and thus the dual lines 20. One of the fluid passages is composed of interconnected passages 38a, 36a and 42a, while the other passage is composed of interconnected passages 38b, 36b and 42b. In order to protect the lines 20 and load-handling attachment mounted on the lift truck carriage 18 from excessive hydraulic pressures which may be created by the hydraulic system of the lift truck 14, the rotary fluid coupling of the take-up assembly 10 includes a pair of pressure-relief valves interacting between the aforementioned pair of fluid passages. Preferably such pressure-relief valves are mounted in the mounting block 28 since, in such location, they also protect the seals 82 of the take-up assembly against such excessive pressures. As illustrated in FIG. 4, one of the pressure-relief valves 88 senses the pressure in passage 42a and, if such pressure exceeds an adjustable predetermined pressure setting as determined by adjusting screw 88a, the valve 88 opens and permits the transfer of fluid from passage 42a to 42b through relief passage 90 and valve port 88b. Conversely, the second relief valve 92 senses the pressure in passage 42b and, if such pressure exceeds a predetermined pressure as determined by adjusting screw 92a, valve 92 opens and permits the transfer of fluid from passage 42b to passage 42a through relief passage 94 and valve port 92b. Both relief valves 88 and 92 may be any of a number of commercially-available pressure-relief valves of either the adjustable or nonadjustable type. For example an adjustable, cartridge-type, pilot-operated, balanced spool relief valve such as Model RPEC manufactured by Sun Hydraulic Corporation of Sarasota, Fla., would be suitable for the purpose.

FIG. 1 and FIGS. 5-10 illustrate the fluid coupling, indicated generally as 100, by which the forward ends of the flexible fluid lines 20 extending from the take-up assembly 10 are connected to the lift truck load carriage 18. The coupling 100 comprises an elongate flexible restraint composed of a series of segments 102, which can be of variable number, coupled together in tight abutting relation to each other by a pair of cables 104 extending continuously from segment to segment through apertures in the opposing edges of the segments, such cables 104 having caps or ferrules 105 swaged onto each end thereof to maintain the segments in tight abutting relation to each other. The cable apertures in the edges of a pair of segments at one end of the coupling restraint have lateral openings 106 (FIG. 8) therein to permit final transverse insertion of the cables 104 into the apertures after the ferrules 105 have been swaged to the ends of the cables. This enables a tighter construction of the restraint structure. The lateral openings 106 are effectively closed upon fastening of the restraint to the lift truck carriage 18 by means of a clamping bracket 108 which bolts to the rear surface of the lift truck carriage 18. A pin 108a, fastened to the interior of the bracket 108, is wedged between the aforementioned pair of segments to prevent the end of the restraint from slipping out of the bracket, and also to impose a spreading prestress on the pair of segments to place the cables 104 in tension to maximize the tightness of the restraint.

Figure 5:
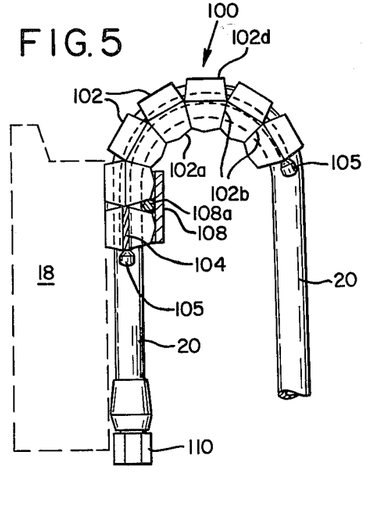
FIG. 5 is a partially sectional side view of a fluid line coupling structure by which the fluid lines are connected to the lift truck carriage, shown in its condition of limiting the bending of the fluid lines to a minimum radius of curvature.
Figure 6:
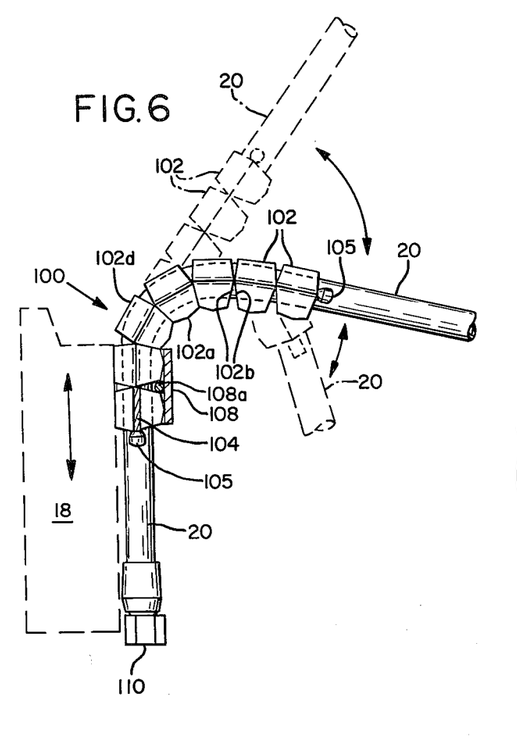
FIG. 6 is a partially sectional side view of the coupling of FIG. 5 showing various other bending conditions thereof depending upon the vertical relationship between the load carriage and the take-up assembly.
Figure 7:
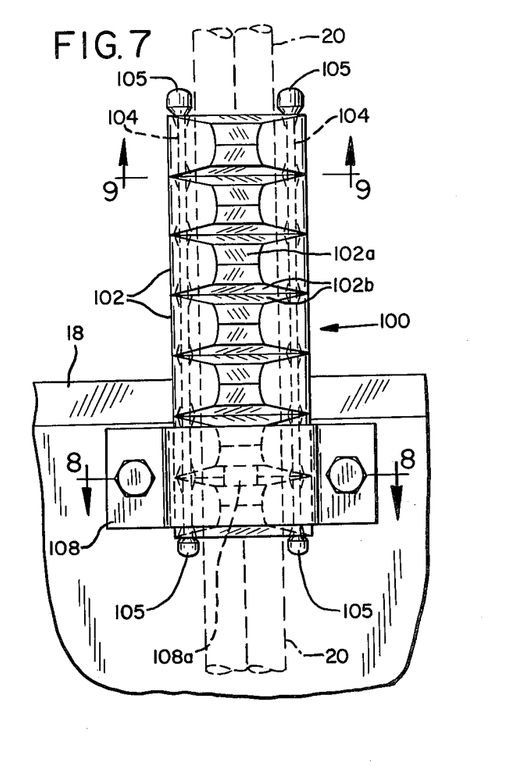
FIG. 7 is a rear view of the coupling of FIGS. 5 and 6 shown in a substantially straight, unbent configuration.
Figure 8:
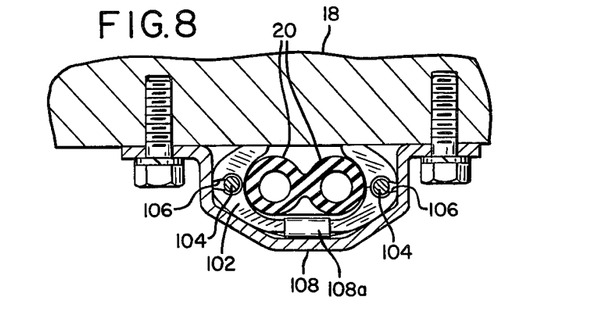
FIG. 8 is a cross-sectional view taken along line 8—8 of FIG. 7.
Figure 9:
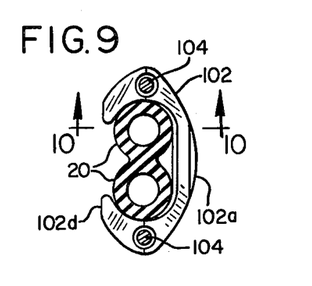
FIG. 9 is a cross-sectional view taken along line 9—9 of FIG. 7.
Figure 10:
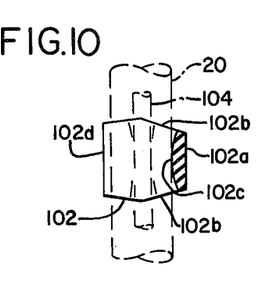
FIG. 10 is a cross-sectional view taken along line 10—10 of FIG. 9 with the fluid line shown in phantom.

Each of the segments 102 defines an enclosure, as best seen in the cross sections of FIGS. 8 and 9, such that the combined series of segments 102 form an elongate enclosure for enclosing a predetermined minor portion of the length of the flexible lines 20 adjacent the carriage 18. The coupling 100 is capable of assuming a straight configuration as shown in FIGS. 1 and 7 for permitting the enclosed portion of the lines 20 also to assume a straight configuration when the carriage 18 is lowered. When, however, the carriage 18 is elevated to the region of the take-up assembly 10, or above the take-up assembly, the coupling 100 assumes various bent configurations as shown in FIG. 6 depending on the elevation of the carriage 18 relative to the line take-up assembly 10. As the carriage 18 and its attached coupling 100 rise above the level of the take-up assembly 10 the coupling and its enclosed lines 20 bend concavely about the inner side 102a of the coupling until a minimum radius of curvature is reached as shown in FIG. 5, such minimum radius of curvature being determined by the taper of the respective tapered surfaces 102b of the respective segments 102 to prevent kinking of the lines 20. Chafing of the lines 20 is minimized by the interior curvature 102c (FIG. 10) at the inner side of each segment 102, which matches the minimum radius of curvature permitted by the coupling 100, and by the location of the cables 104 relative to the elongate enclosure of the coupling 100 such that the cables 104 extend longitudinally along the longitudinal centerline of the lines 20, as best seen in FIGS. 9 and 10.

The elongate outer side 102d of the coupling 100, while serving to retain the fluid lines 20 within the elongate enclosure of the coupling, has an elongate opening extending longitudinally therealong resulting from the fact that each segment 102 has a generally C-shaped cross section as shown in FIGS. 8 and 9. This opening in the outer side 102d of the coupling 100 is needed to facilitate replacement of the lines 20 since the line connectors such as 110 by which the lines 20 are coupled to the load-handling attachment are too large to be drawn longitudinally through the enclosure of the coupling 100. Accordingly the elongate opening in the outer side 102d of the coupling 100 permits passage of the lines 20 transversely through the opening for selective extraction or insertion of the lines with respect to the coupling 100. The existence of such opening does not detract from the ability of the outer side 102d of the coupling to retain the lines 20 within the coupling enclosure because the opening is narrower than the longest cross-sectional dimension of the coupling's oblong enclosure as seen in FIGS. 8 and 9. The resilient nature of the lines 20 enables them to be deformed somewhat in order to pass transversely through the opening.

Figures 11, 12, 13:
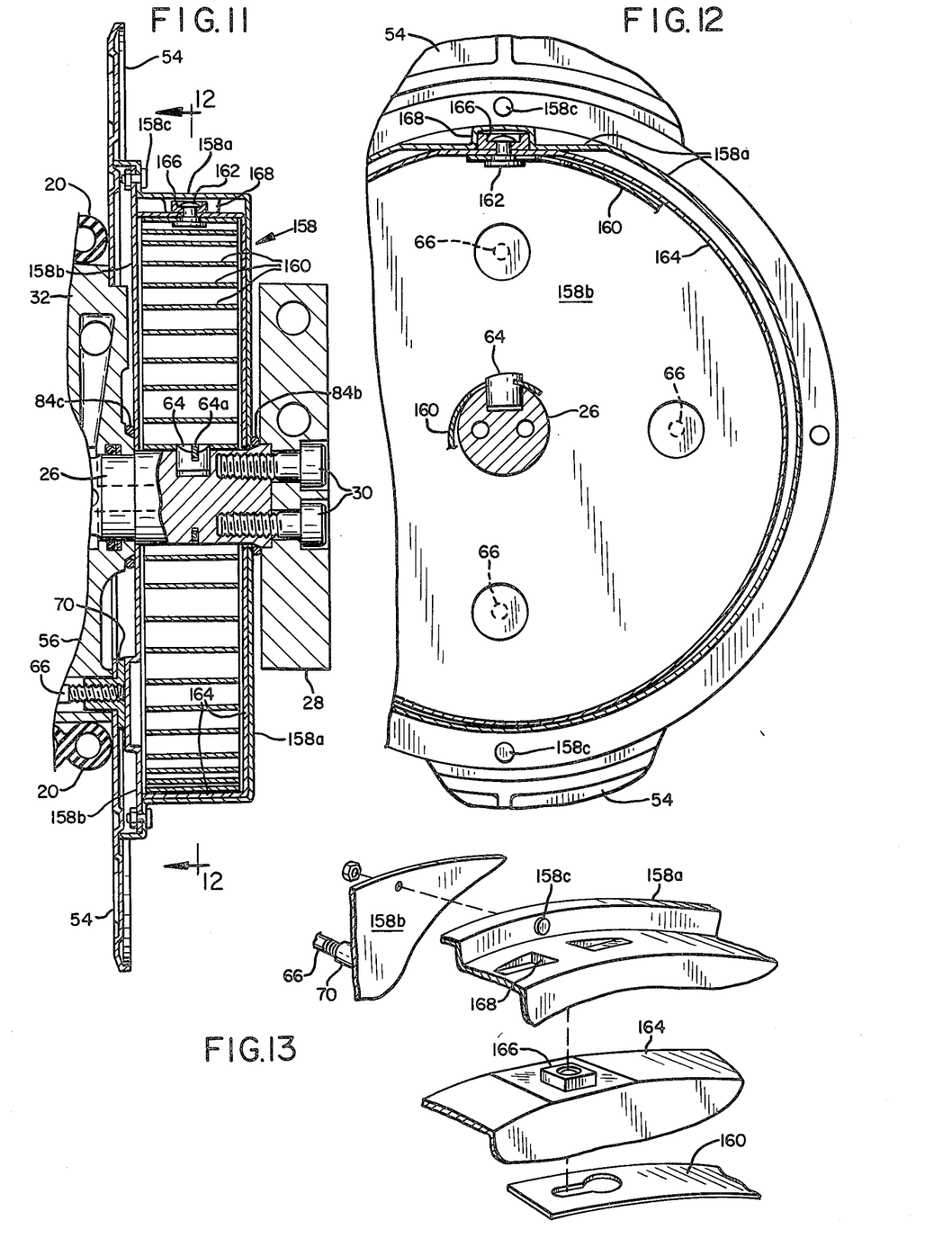
FIG. 11 is a partial transverse cross-sectional view of a further embodiment of the line take-up assembly of the present invention having a reversible retracting spring.
FIG. 12 is a partial cross-sectional view taken along line 12—12 of FIG. 11.
FIG. 13 is an exploded view of portions of the embodiment of FIG. 11, showing their cooperative relationship with each other.

FIGS. 11-13 depict a further embodiment of the invention which includes a reversible helical spring assembly, but otherwise comprises the same journal shaft 26, mounting block 28, fluid line connector 32, line-enclosing flanges 52 and 54 and line-storing hub 56 for storing the fluid lines 20 as does the previous embodiment. The reversible helical spring assembly of FIGS. 11-13 comprises a two-piece spring housing 158 composed of an outer cylindrical spring cover 158a and an inner spring cover plate 158b detachably connected thereto by peripherally-spaced screws 158c. The screws 158c have smooth heads and square shanks fitting through square apertures in the outer spring cover 158a which prevents loosening of the screws 158c unless the hub 56 and inner flange 54 have first been removed so as to relieve tension on the helical spring 160. The inner spring cover plate 158b is connected to the hub 56 by elongate connectors 66 and nuts 70 in the same manner as described with respect to the previous embodiment.

The inner end of the helical spring 160 is affixed to the journal shaft 26 by the same catch assembly 64 described with respect to the previous embodiment. In connection with the reversibility of the spring 160, it is noteworthy that the catch assembly 64 is conveniently reversible simply by removal of the snap ring 64a, rotation of the cylindrical catch through an angle of 180° and replacement of the snap ring 64a. The outer end of the spring 160, rather than being fixedly connected to the spring housing 158, is instead fixedly connected by a rivet 162 to the interior surface of a generally cylindrical, dish-shaped spring enclosure 164 which fits slidably within the outer spring cover 158a of the spring housing 158. The rivet 162 also fixedly connects a key member 166 to the exterior of the spring enclosure 164, such key member 166 being axially slidable alternatively into and out of engagement with a matching keyway 168 formed in the perimeter of the outer spring cover 158a and extending generally parallel to the axis of rotation of the take-up assembly. Thus retracting torque is transmitted by the spring 160 through the rivet 162 and key member 166 to the keyway 168, which in turn transmits the torque through the outer cover 158a to the inner cover plate 158b and thence through nuts 70 to the hub 56.

As shown in FIG. 12, the spring enclosure 164 is mounted nonconcentrically within the spring housing 158. This does not interfere with proper operation of the spring 160, but has the advantage of requiring very little increase in overall diameter of the outer spring cover 158a over that required for the spring housing in the nonreversible embodiment of FIG. 2. Moreover, no extra peripheral clearance between the outer spring cover 158a and spring enclosure 164 is required to compensate for possible deformation of the spring enclosure 164 due to spring forces, since the spring enclosure 164 is of an extremely rigid dish-shaped construction. Accordingly the greatest clearance between the spring housing and spring enclosure is required only for the key and keyway structure 166, 168, which is a more compact detachable spring anchoring structure than that used in previous reversible springs. Because of the nonconcentric mating of the spring enclosure 164 within the spring housing as shown in FIG. 12, this clearance need not be projected annularly entirely around the spring housing thereby decreasing by one-half the effect of such clearance on the overall diameter of the outer spring cover 158a of the spring housing 158.

In operation, to reverse the take-up assembly of FIGS. 11-13 so that such take-up assembly can be used on the opposite side of the lift truck mast, the hub 56 and flanges 52 and 54 are first separated from the spring assembly and removed from the journal shaft 26 in the same manner described with respect to the previous embodiment. The inner end of the spring 160 is then detached from the catch assembly 64 by counterrotation of the spring 160 away from the catch assembly 64 after retracting tension has been removed from the spring 160. With the spring assembly no longer connected to the hub 56, there is enough looseness between the spring assembly and the journal shaft 26 to slide the spring assembly off of the shaft clearing the catch assembly 64. Thereafter, with the spring assembly separated from the remainder of the take-up assembly and lying on a workbench or other supporting surface with the inner spring cover plate 158b facing up, the screws 158c are removed so that the plate 158b can be lifted from the outer spring cover 158a. Thereafter the spring enclosure 164 and its enclosed spring 160 are simply lifted from the outer spring cover 158a, inverted and reinserted into the outer spring cover 158a with the key member 166 being once more slidably inserted into the keyway 168. The inner cover plate 158b is then replaced. The catch assembly 64 on the journal shaft 26 is reversed by removing the snap ring 64a, rotating the catch member 180° and replacing the snap ring in the manner previously described, after which the spring assembly 158 is slipped onto the journal shaft 26 and the inner end of the spring 160 is brought into engagement with the catch assembly 64 by rotation of the spring assembly relative to the journal shaft 26. Thereafter the hub 56 and flanges 52 and 54 are inverted (so that the previous outer flange 52 now becomes the inner flange) and replaced on the journal shaft 26 such that the nuts 70 of the spring assembly are inserted into the mating apertures of the hub 56. The connectors 66 and 78 (FIG. 2) are replaced and the take-up assembly may then be mounted on the opposite side of the mast.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a take-up assembly for a flexible fluid line comprising a journal member having a first fluid passage therein, a line connector mounted on said journal member for rotation about an axis of rotation and having a second fluid passage therein communicating with said first fluid passage so as to form a rotary fluid coupling, said line connector having line attachment means for detachably connecting said fluid line to said line connector, and a reel mounted on said journal member for rotation about said axis of rotation, said reel including respective first and second line-enclosing flanges disposed opposite to and axially spaced from each other and a line-storing hub extending axially between said flanges about which said fluid line is collected in windings, the improvement which comprises respective first and second line-supporting surface means on said hub having axially-extending widths traversing substantially the entire distance between said flanges for supporting said windings of said fluid line, and means detachably connecting said first flange to said line-storing hub for permitting removal of said first flange therefrom while permitting the retention of substantially the entire width of said first line-supporting surface means on said hub, said second line-supporting surface means being located adjacent said line attachment means and being axially removable from said hub and from said first line-supporting surface means upon detachment of said first flange from said hub for facilitating access to said line attachment means.

2. The take-up assembly of claim 1 wherein said first line-supporting surface means comprises the major line-supporting surface area of said hub.

3. In a take-up assembly for flexible line comprising a journal member, a line connector mounted on said journal member for rotation about an axis of rotation, a reel mounted on said journal member for rotation about said axis of rotation, said reel including respective first and second line-enclosing flanges disposed opposite to and axially-spaced from each other and a line-storing hub extending axially between said flanges about which said line is collected in windings, and a helical spring assembly mounted against one of said flanges for urging rotation of said line-storing hub, the improvement which comprises a plurality of elongate connectors, each extending through both of said flanges and said line-storing hub and being connected to said helical spring assembly, and each detachably interconnecting each of said flanges, said hub and said helical spring assembly with respect to one another.

4. The take-up assembly of claim 3 wherein said helical spring assembly and said line-storing hub include mating detachable interlocking members through which said helical spring assembly urges rotation of said hub, said interlocking members including means for urging rotation of said hub despite the removal of all of said elongate connectors from said take-up assembly.

5. In a take-up assembly for a flexible fluid line comprising a journal member having a first fluid passage therein, a line connector mounted on said journal member at an interface therebetween for rotation about an axis of rotation and having a second fluid passage therein communicating with said first fluid passage so as to form a rotary fluid coupling, a reel mounted on said journal member for rotation about said axis of rotation, said reel including respective first and second line-enclosing flanges disposed opposite to and axially-spaced from each other and a line-storing hub extending axially between said flanges about which said line is collected in windings, and a helical spring assembly mounted against one of said flanges for urging rotation of said reel, the improvement which comprises an annular seal-supporting surface concentric with said axis of rotation and mounted on one of said journal member and line connector, a seal-engaging surface mounted on the other of said journal member and line connector, and resilient seal means interposed between said line connector and said journal member for preventing the entry of contaminants into said interface between said journal member and line connector, said resilient seal means having an annular shape and being stretched in tension about said annular seal-supporting surface, said annular seal-supporting surface being tapered axially so as to cause the tension in said seal means to urge said seal means in an axial direction against said seal-engaging surface.

6. In a take-up assembly for a flexible fluid line comprising a journal member having separate first and second fluid passages therein connected to a source of pressurized fluid, a line connector mounted on said journal member for rotation about an axis of rotation and having separate third and fourth fluid passages therein communicating with said first and second fluid passages respectively so as to form, together with said journal member, a rotary fluid coupling having dual fluid passages through which fluid may be simultaneously supplied and exhausted from said line connector, said line connector having a pair of line attachment means thereon for detachably connecting a pair of flexible fluid lines to said dual fluid passages of said rotary fluid coupling, and a reel mounted on said journal member for rotation about said axis of rotation, said reel including respective first and second line-enclosing flanges disposed opposite to and axially spaced from each other and a line-storing hub extending axially between said flanges about which said fluid lines are collected in windings, the improvement which comprises pressure relief alve means mounted on said rotary fluid coupling interconnecting said dual fluid passages for permitting the transfer of fluid from one of said passages to the other in response to the pressure of fluid produced by said source of pressurized fluid in said one passage exceeding a predetermined pressure.

7. The take-up assembly of claim 6 wherein said pressure relief valve means is mounted on said journal member and interconnects said first and second fluid passages.

8. The take-up assembly of claim 6 wherein said pressure relief valve means includes means for variably adjusting said predetermined pressure.

9. The take-up assembly of claim 6, 7 or 8 wherein said pressure relief valve means comprises a pair of pressure relief valves interconnecting said dual fluid passages for permitting the transfer of fluid from either one of said passages to the other passage.

10. In a take-up assembly, for an elongate flexible fluid line having a first end connectable to a mounting position and a second end connectable for vertical reciprocation both above and below said mounting position, comprising a journal member connectable to said mounting position having a first fluid passage therein, a line connector for said first end of said fluid line mounted on said journal member for rotation about an axis of rotation and having a second fluid passage therein communicating with said first fluid passage so as to form a rotary fluid coupling, a reel mounted on said journal member for rotation about said axis of rotation about which said line is collected in windings and a helical spring assembly mounted against said reel for urging rotation of said reel and thereby imposing a tension on said fluid line, the improvement which comprises fluid line coupling means for connecting said second end of said flexible fluid line for vertical reciprocation with respect to said mounting position, said fluid line coupling means comprising elongate flexible restraint means defining an elongate enclosure for enclosing a predetermined minor portion of the length of said flexible fluid line adjacent said second end thereof, said restraint means including an elongate inner side comprising means for limiting the curvature of said flexible fluid line concavely about said inner side to a minimum radius of curvature even though said line is under said tension imposed by said spring assembly, and said restraint means further including an elongate outer side separated from and opposed to said inner side having means for retaining said fluid line within said elongate enclosure and having means defining an elongate opening therein extending longitudinally along said outer side for permitting passage of said flexible fluid line transversely through said elongate opening so as to allow selective extraction or insertion of said fluid line transversely with respect to said elongate enclosure, said elongate enclosure of said restraint means having a predetermined width extending substantially transverse to said minimum radius of curvature, said elongate opening in said outer side of said restraint means having a width narrower than said predetermined width of said elongate enclosure so as to normally retain said fluid line within said enclosure despite the presence of said elongate opening.

11. In a take-up assembly for flexible line comprising a journal member, a line connector mounted on said journal member for rotation about an axis of rotation, a reel mounted on said journal member for rotation about said axis of rotation about which said line is collected in windings, and a helical spring assembly for urging rotation of said reel comprising a generally cylindrical spring housing mounted concentrically with said axis of rotation for rotating in unison with said reel and a helical spring therein having an outer end interconnected with said spring housing for urging rotation thereof and an inner end connected to said journal member, the improvement which comprises a generally cylindrical spring enclosure enclosing said spring and slidable axially selectively into and out of said spring housing in unison with said spring, said spring enclosure being mounted within said spring housing nonconcentrically with respect to said axis of rotation.

12. The take-up assembly of claim 11 wherein said spring enclosure is of generally cylindrical, dish-shaped configuration.

13. In a take-up assembly for flexible line comprising a journal member, a line connector mounted on said journal member for rotation about an axis of rotation, a reel mounted on said journal member for rotation about said axis of rotation about which said line is collected in windings, and a helical spring assembly for urging rotation of said reel comprising a generally cylindrical spring housing mounted concentrically with said axis of rotation for rotating in unison with said reel and a helical spring therein having an outer end interconnected with said spring housing for urging rotation thereof and an inner end connected to said journal member, the improvement which comprises a generally cylindrical spring enclosure enclosing said spring and slidable axially selectively into and out of said spring housing in unison with said spring, the outer end of said spring being fixedly connected to said spring enclosure, and said spring enclosure and spring housing respectively having mating, selectively detachable interlocking means for transmitting torque from said spring enclosure to said spring housing.

14. The take-up assembly of claim 13 wherein said interlocking means comprise a key member and a mating keyway each mounted on a respective one of said spring enclosure and spring housing, said keyway extending generally parallel to said axis of rotation so as to permit sliding of said key member with respect to said keyway in an axial direction.

15. The take-up assembly of claim 10 wherein said restraint means comprises a series of segments interconnected for articulation with respect to each other and a bracket for fastening an end of said restraint means, said bracket having a member insertable between adjacent ones of said segments for securing said segments to said bracket.

* * * * *

UNITED STATES PATENT AND TRADEMARK OFFICE
CERTIFICATE OF CORRECTION

PATENT NO. : 4,487,218
DATED : December 11, 1984
INVENTOR(S) : Elie C. Sifri

It is certified that error appears in the above-identified patent and that said Letters Patent is hereby corrected as shown below:

Col. 7, line 10  Delete the word "ways".

Col. 9, line 59  Change "cOn-" to -- con- --.

Col. 15, line 23  Change "alve" to --valve--.

Signed and Sealed this

Thirtieth Day of April 1985

[SEAL]

Attest:

DONALD J. QUIGG

Attesting Officer　　Acting Commissioner of Patents and Trademarks